United States Patent
Kagami et al.

(10) Patent No.: US 10,723,392 B2
(45) Date of Patent: Jul. 28, 2020

(54) VEHICLE MEMBER JOIN STRUCTURE

(71) Applicant: TOYOTA JIDOSHA KABUSHIKI KAISHA, Toyota-shi (JP)

(72) Inventors: Ayaka Kagami, Inazawa (JP); Soshiro Murata, Nagoya (JP); Yasuhide Matsuo, Toyota (JP); Yasushi Azuma, Toyota (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 97 days.

(21) Appl. No.: 16/183,824

(22) Filed: Nov. 8, 2018

(65) Prior Publication Data

US 2019/0176902 A1 Jun. 13, 2019

(30) Foreign Application Priority Data

Dec. 7, 2017 (JP) .................. 2017-235584

(51) Int. Cl.
| | |
|---|---|
| B62D 27/02 | (2006.01) |
| B62D 25/06 | (2006.01) |
| B60J 10/79 | (2016.01) |
| B62D 29/00 | (2006.01) |
| B60J 10/777 | (2016.01) |

(52) U.S. Cl.
CPC ............ B62D 27/02 (2013.01); B60J 10/777 (2016.02); B60J 10/79 (2016.02); B62D 25/06 (2013.01); B62D 29/007 (2013.01); B62D 29/008 (2013.01)

(58) Field of Classification Search
CPC ...... B62D 27/02; B62D 25/06; B62D 29/007; B62D 29/008; B60J 10/777
See application file for complete search history.

(56) References Cited

U.S. PATENT DOCUMENTS

| | | | | |
|---|---|---|---|---|
| 1,909,287 A | * | 5/1933 | Ledwinka | B62D 31/00 296/192 |
| 4,258,519 A | * | 3/1981 | Hugens | E04B 1/6112 52/282.1 |
| 4,909,561 A | * | 3/1990 | Lovaas | B60J 7/041 296/100.04 |
| 5,263,761 A | * | 11/1993 | Hathaway | B60J 7/104 296/100.18 |
| 7,556,318 B2 | * | 7/2009 | Miyajima | B60N 2/24 297/440.21 |
| 2005/0140158 A1 | | 6/2005 | Ogawa et al. | |
| 2014/0250800 A1 | * | 9/2014 | Hirashima | B61D 17/12 52/45 |
| 2018/0209468 A1 | * | 7/2018 | Freis | F16B 33/008 |

FOREIGN PATENT DOCUMENTS

| | | |
|---|---|---|
| JP | 2005-119577 | 5/2005 |
| JP | 2010-207898 | 9/2010 |

* cited by examiner

Primary Examiner — Lori L Lyjak
(74) Attorney, Agent, or Firm — Oblon, McClelland, Maier & Neustadt, L.L.P.

(57) ABSTRACT

A vehicle member join structure includes a sheet-shaped first member made of a lightweight metal, a sheet-shaped second member made of a ferrous metal, a rivet made of a ferrous metal and including a shaft that penetrates the first member and a head that remains at an outer surface of the first member, the shaft being welded to the second member so as to connect the first member and the second member together, and a waterproof section that prevents water ingress by covering a region where the rivet and the first member contact each other.

16 Claims, 11 Drawing Sheets

VEHICLE MEMBER JOIN STRUCTURE

CROSS-REFERENCE TO RELATED APPLICATION

This application is based upon and claims the benefit of priority of the prior Japanese Patent Application No. 2017-235584, filed on Dec. 7, 2017, the entire contents of which are incorporated herein by reference.

FIELD

The embodiments discussed herein are related to a vehicle member join structure.

BACKGROUND

As a structure for joining together different types of materials, Patent Document 1 (Japanese Patent Application Laid-Open (JP-A) No. 2010-207898) discloses a structure in which an aluminum alloy member and a steel member are joined together by welding a rivet made of a ferrous metal and the steel member together in a state in which a shaft of the rivet has been made to penetrate the aluminum alloy member, and a head of the rivet remains at an outer surface of the aluminum alloy member. Note that Patent Document 2 (JP-A No. 2005-119577) discloses a structure in which a roof panel made of an aluminum alloy and a roof side rail made of a ferrous metal are joined together by a non-penetrating rivet, and the roof side rail is configured by a high tensile strength steel sheet.

In the structure disclosed in Patent Document 1 (JP-A No. 2010-207898), the head of the rivet made of a ferrous metal is exposed at the outer surface of the aluminum alloy member, and so there is a possibility that electrolytic corrosion (also referred to as galvanic corrosion) due to water ingress might occur at a location where the rivet is provided on the vehicle exterior of a vehicle.

SUMMARY

In consideration of the above circumstances, an object of the present disclosure is to obtain a vehicle member join structure capable of suppressing electrolytic corrosion from occurring between a rivet made of a ferrous metal and a first member made of a lightweight metal.

A vehicle member join structure according to a first aspect includes: a sheet-shaped first member made of a lightweight metal; a sheet-shaped second member made of a ferrous metal; a rivet made of a ferrous metal and including a shaft that penetrates the first member and a head that remains at an outer surface of the first member, the shaft being welded to the second member so as to connect the first member and the second member together; and a waterproof section that prevents water ingress by covering a region where the rivet and the first member contact each other.

In the vehicle member join structure of the first aspect, the shaft of the ferrous rivet is welded to the ferrous second member in a state in which the rivet shaft has penetrated the lightweight metal first member and the rivet head remains at the outer surface of the first member, thereby connecting the first member and the second member together. The region where the rivet and the first member contact each other is covered by the waterproof section, such that water does not readily enter the region where the rivet and the first member contact each other. This enables electrolytic corrosion caused by water present between the rivet and the first member to be suppressed.

A vehicle member join structure according to a second aspect is the vehicle member join structure of the first aspect, wherein a high tensile strength steel material or an ultra-high tensile strength steel material is employed as the second member.

In the vehicle member join structure of the second aspect, a high tensile strength steel material or an ultra-high tensile strength steel material is employed as the ferrous second member, thereby enabling the strength of the second member to be better secured than in cases in which the second member is a general steel material.

A vehicle member join structure according to a third aspect is the vehicle member join structure of the first aspect, wherein the first member is a roof panel that extends, at an upper section of a vehicle, along a vehicle front-rear direction and a vehicle width direction, the second member is a side outer panel that extends along the vehicle front-rear direction at a side section of the vehicle, and the waterproof section is a sealant that covers a region at a vehicle outer side of where the rivet and the roof panel contact each other.

In the vehicle member join structure of the third aspect, the lightweight metal roof panel and the ferrous side outer panel are connected together by making the shaft of the ferrous rivet penetrate the roof panel and welding the rivet shaft to the side outer panel. The region at the vehicle outer side of where the rivet and the roof panel contact each other is covered by the sealant. This enables electrolytic corrosion at the join configured by the rivet between the roof panel and the side outer panel to be suppressed.

A vehicle member join structure according to a fourth aspect is the vehicle member join structure of the third aspect, wherein a shelf-shaped section that has a length direction along the vehicle front-rear direction and is disposed at a side of the head of the rivet is formed to at least one from out of the roof panel or the side outer panel.

In the vehicle member join structure of the fourth aspect, the shelf-shaped section with its length direction along the vehicle front-rear direction at the side of the rivet head is formed to at least one from out of the roof panel or the side outer panel. A sealant nozzle for discharging sealant is thereby guided by making the sealant nozzle contact the shelf-shaped section. This improves the ease of application of the sealant.

A vehicle member join structure according to a fifth aspect is the vehicle member join structure of the first aspect, wherein the first member is a roof panel that extends, at an upper section of a vehicle, along a vehicle front-rear direction and a vehicle width direction, and the second member is a front header that extends along the vehicle width direction at a lower side of a vehicle front-rear direction front end of the roof panel.

In the vehicle member join structure of the fifth aspect, the lightweight metal roof panel and the ferrous front header are connected together by making the shaft of the ferrous rivet penetrate the roof panel and welding the rivet shaft to the front header. The waterproof section that prevents water ingress by covering the region where the rivet and the roof panel contact each other is also provided. This enables electrolytic corrosion at the join configured by the rivet between the roof panel and the front header to be suppressed.

A vehicle member join structure according to a sixth aspect is the vehicle member join structure of the first aspect, wherein the first member is a roof panel that extends, at an upper section of a vehicle, along a vehicle front-rear direction and a vehicle width direction, and the second member is a back window frame that extends along the vehicle width direction at a lower side of a vehicle front-rear direction rear end of the roof panel.

In the vehicle member join structure of the sixth aspect, the lightweight metal roof panel and the ferrous back window frame are connected together by making the shaft of the ferrous rivet penetrate the roof panel and welding the rivet shaft to the back window frame. The waterproof section that prevents water ingress by covering the region where the rivet and the roof panel contact each other is also provided. This enables electrolytic corrosion at the join configured by the rivet between the roof panel and the back window frame to be suppressed.

A vehicle member join structure according to a seventh aspect is the vehicle member join structure of the first aspect, wherein the first member is a side outer panel that is disposed along an edge of a triangular window provided at a rear section of a vehicle and that extends along a vehicle front-rear direction, and the second member is a roof side outer portion that extends along the vehicle front-rear direction at a vehicle inner side of the side outer panel.

In the vehicle member join structure of the seventh aspect, the lightweight metal side outer panel and the ferrous roof side outer portion are connected together by making the shaft of the ferrous rivet penetrate the side outer panel and welding the rivet shaft to the roof side outer portion. The waterproof section that prevents water ingress by covering the region where the rivet and the side outer panel contact each other is also provided. This enables electrolytic corrosion at the join configured by the rivet between the side outer panel and the roof side outer portion to be suppressed.

A vehicle member join structure according to an eighth aspect is the vehicle member join structure of any one of the fifth aspect to the seventh aspect, wherein the waterproof section is a waterproof material that is attached at a position covering at least part of a region where the rivet and the first member contact each other.

In the vehicle member join structure of the eighth aspect, the waterproof material is attached at a position covering at least part of the region where the rivet and the first member contact each other, thereby facilitating waterproofing of the region where the rivet and the first member contact each other using the waterproof material.

A vehicle member join structure according to a ninth aspect is the vehicle member join structure of the eighth aspect, wherein window glass is disposed extending from a position encompassing a vehicle vertical direction upper side of the rivet toward a vehicle front-rear direction outer side, and the waterproof material is disposed further toward a vehicle front-rear direction inner side than a vehicle front-rear direction outer end of the rivet and is configured so as to seal between the window glass and the first member.

In the vehicle member join structure of the ninth aspect, the waterproof material is disposed further toward the vehicle front-rear direction inner side than the vehicle front-rear direction outer end of the rivet and is configured so as to seal between the window glass and the first member. Namely, the waterproof material is disposed further toward the side where water might ingress between the window glass and the first member than the rivet. This enables both the amount of waterproof material employed to be reduced and electrolytic corrosion at the portion contacting the rivet to be suppressed.

A vehicle member join structure according to a tenth aspect is the vehicle member join structure of the eighth aspect, wherein window glass is disposed extending from a position encompassing a vehicle vertical direction upper side of the rivet toward a vehicle width direction outer side, and the waterproof material is disposed further toward a vehicle width direction inner side than a vehicle width direction outer end of the rivet and is configured so as to seal between the window glass and the first member.

In the vehicle member join structure of the tenth aspect, the waterproof material is disposed further toward the vehicle width direction inner side than the vehicle width direction outer end of the rivet, and is configured so as to seal between the window glass and the first member. Namely, the waterproof material is disposed further toward the side where water might ingress between the window glass and the first member than the rivet. This enables both the amount of waterproof material employed to be reduced and electrolytic corrosion at the portion contacting the rivet to be suppressed.

A vehicle member join structure according to an eleventh aspect is the vehicle member join structure of the first aspect, wherein the first member is a side outer panel that extends along a vehicle front-rear direction at a side section of a vehicle, the second member is a roof side rail outer portion that extends along the vehicle front-rear direction at a vehicle vertical direction lower side of the side outer panel, and the waterproof section is configured by joining the lightweight metal roof panel and the side outer panel together at a join running along the vehicle front-rear direction at a contact portion where the lightweight metal roof panel and the side outer panel are made to contact each other.

In the vehicle member join structure of the eleventh aspect, the waterproof section is configured by joining the lightweight metal roof panel and the lightweight metal side outer panel together at a join running along the vehicle front-rear direction at a contact portion where the lightweight metal roof panel and the side outer panel are made to contact each other. Water ingress into the region where the rivet and the side outer panel contact each other is thus suppressed by the waterproof section, thereby suppressing electrolytic corrosion.

The vehicle member join structure according to the present disclosure enables electrolytic corrosion to be suppressed from occurring between a ferrous rivet and a lightweight metal first member.

BRIEF DESCRIPTION OF DRAWINGS

Exemplary embodiments of the present disclosure will be described in detail based on the following figures, wherein.

DESCRIPTION OF EMBODIMENTS

Figure 1:
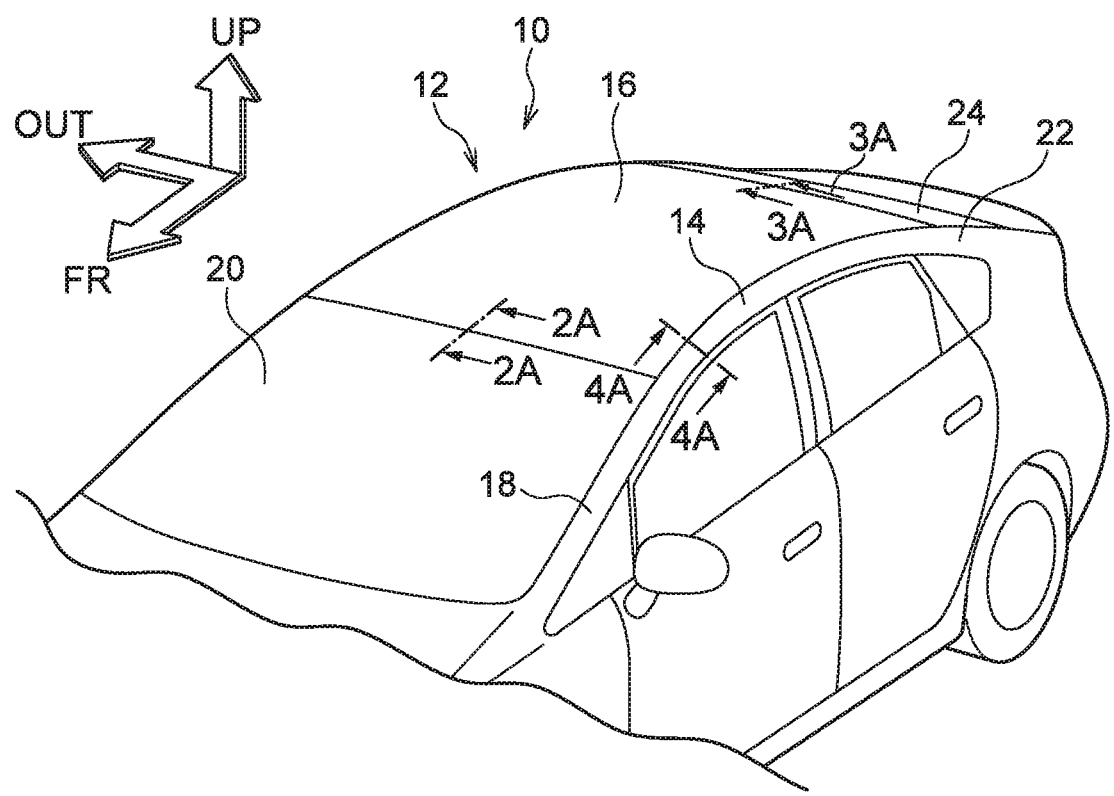
FIG. 1 is a perspective view illustrating an upper section of a vehicle applied with a vehicle member join structure according to a first exemplary embodiment.

Detailed explanation follows regarding exemplary embodiments of the present disclosure, based on the drawings. Note that in the drawings, the arrow FR indicates a vehicle front side, the arrow UP indicates a vehicle upper side, and the arrow OUT indicates a vehicle width direction outer side, as appropriate.

First Exemplary Embodiment

Explanation follows regarding a vehicle member join structure according to a first exemplary embodiment, with reference to FIG. 1 to FIG. 6.

FIG. 1 is a perspective view illustrating an upper section 12 of a vehicle 10 applied with the vehicle member join structure of the first exemplary embodiment. As illustrated in FIG. 1, a roof side rail 14 is provided extending substantially along the vehicle front-rear direction at a vehicle width direction outer end of the upper section 12 of the vehicle 10. Although a side section on the vehicle width direction right side as viewed from the vehicle rear is not visible in FIG. 1, the roof side rails 14 are provided in a left and right pair at either vehicle width direction end of the upper section 12. The upper section 12 of the vehicle 10 is also provided with a roof panel 16 spanning between the left and right pair of roof side rails 14. The roof panel 16 extends substantially in the vehicle width direction and substantially in the vehicle front-rear direction. In the first exemplary embodiment, the roof panel 16 has a curved shape in which a vehicle front-rear direction intermediate portion of the roof panel 16 projects further toward the upper side than both vehicle front-rear direction ends of the roof panel 16.

Vehicle front-rear direction front ends of the left and right pair of roof side rails 14 are connected to respective upper ends of front pillars 18. Note that the front pillar on the vehicle width direction right side as viewed from the vehicle rear is not visible in FIG. 1. Windshield glass 20, serving as window glass, is provided between the left and right pair of front pillars 18 at the vehicle front side of the roof panel 16.

A front header 32 (see FIG. 2) that links the left and right pair of roof side rails 14 together is provided at the vehicle vertical direction lower side (namely, the vehicle inner side) of a front end of the roof panel 16 at the upper section 12 of the vehicle 10.

Vehicle front-rear direction rear ends of the left and right pair of roof side rails 14 are connected to respective upper ends of rear pillars 22. Note that the rear pillar on the vehicle width direction right side as viewed from the vehicle rear is not visible in FIG. 1. Back window glass 24, serving as window glass, is provided between the left and right pair of rear pillars 22 at the vehicle rear side of the roof panel 16. A back window frame 42 (see FIG. 3) that links the left and right pair of roof side rails 14 together is provided at the vehicle vertical direction lower side (namely, the vehicle inner side) of a rear end of the roof panel 16 at the upper section 12 of the vehicle 10.

Figure 2:
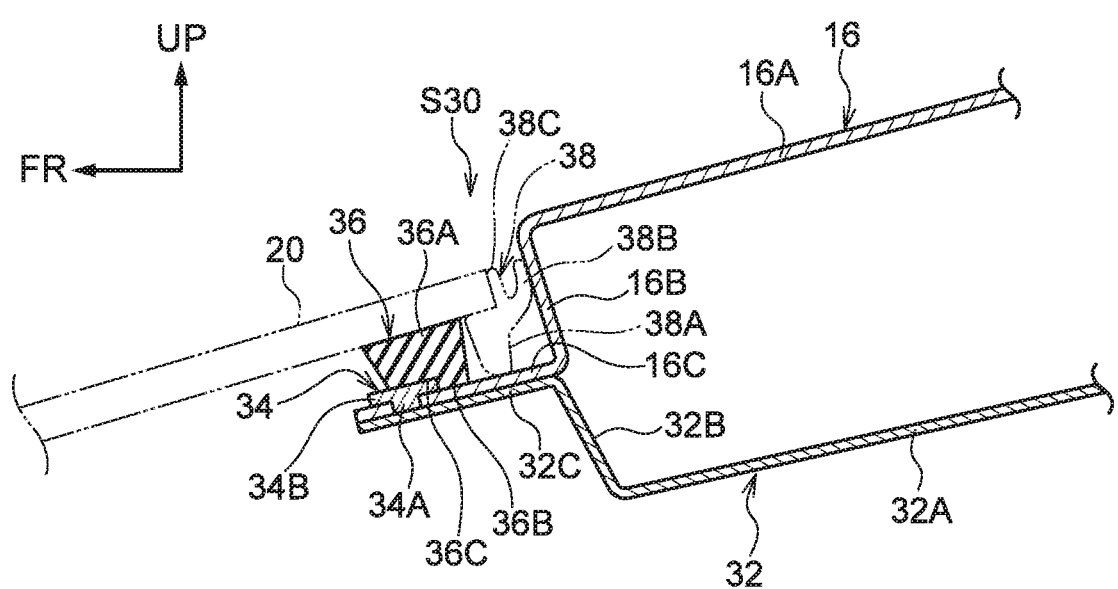
FIG. 2 is a cross-section (sectioned along line 2A-2A in FIG. 1) illustrating a join between a roof panel and a front header employed in a vehicle member join structure according to the first exemplary embodiment.

FIG. 2 is a cross-section (sectioned along line 2A-2A in FIG. 1) illustrating a first join structure S30, serving as a vehicle member join structure. As illustrated in FIG. 2, the roof panel 16 includes a main section 16A that extends substantially along the vehicle width direction and substantially along the vehicle front-rear direction and configures a location of the roof panel 16 with a large surface area. The roof panel 16 also includes a vertical wall 16B extending from a vehicle front-rear direction front end of the main section 16A substantially toward the vehicle lower side, and a flange 16C extending from a lower end of the vertical wall 16B substantially toward the vehicle front side. The roof panel 16 is made of a lightweight metal such as an aluminum alloy or a magnesium alloy. In the first exemplary embodiment, the roof panel 16 is formed of an aluminum alloy. Note that the roof panel 16 is an example of a sheet-shaped first member.

The front header 32 includes a horizontal wall 32A disposed substantially along the vehicle width direction and substantially along the vehicle front-rear direction, a vertical wall 32B extending from a vehicle front-rear direction front end of the horizontal wall 32A substantially toward the vehicle upper side, and a flange 32C extending from an upper end of the vertical wall 32B substantially toward the vehicle front side. The flange 16C of the roof panel 16 is superimposed on an upper face of the flange 32C of the front header 32. The front header 32 is made of a ferrous metal. In the first exemplary embodiment, the front header 32 is formed of a high tensile strength steel sheet or a hot stamped material that is an ultra-high tensile strength steel sheet. Note that the front header 32 is an example of a sheet-shaped second member. In the first exemplary embodiment, "high tensile strength steel sheets" (namely, for automotive use) refer, for example, to automotive steel sheets with a tensile strength (nominal tensile strength, the same applies below) of 350 MPa or above, and steel sheets with a tensile strength of 590 MPa or above are referred to as "ultra-high tensile strength steel sheets".

The first join structure S30 includes a rivet 34 that is made of a ferrous metal and that connects the flange 16C of the roof panel 16 and the flange 32C of the front header 32 together. The rivet 34 includes a shaft 34A and a head 34B. The shaft 34A of the rivet 34 penetrates the flange 16C of the roof panel 16, and the head 34B of the rivet 34 remains at an outer surface (an upper face side in the first exemplary embodiment) of the flange 16C. The flange 16C of the roof panel 16 and the flange 32C of the front header 32 are connected to each other by welding the shaft 34A of the ferrous rivet 34 and the flange 32C of the ferrous front header 32 together. Namely, the flange 16C and the flange 32C are connected to each other by sandwiching the flange 16C of the roof panel 16 between the head 34B of the rivet 34 and the flange 32C of the front header 32. In the first exemplary embodiment, the shaft 34A of the rivet 34 and the flange 32C of the front header 32 are joined together by spot welding.

Figure 6:
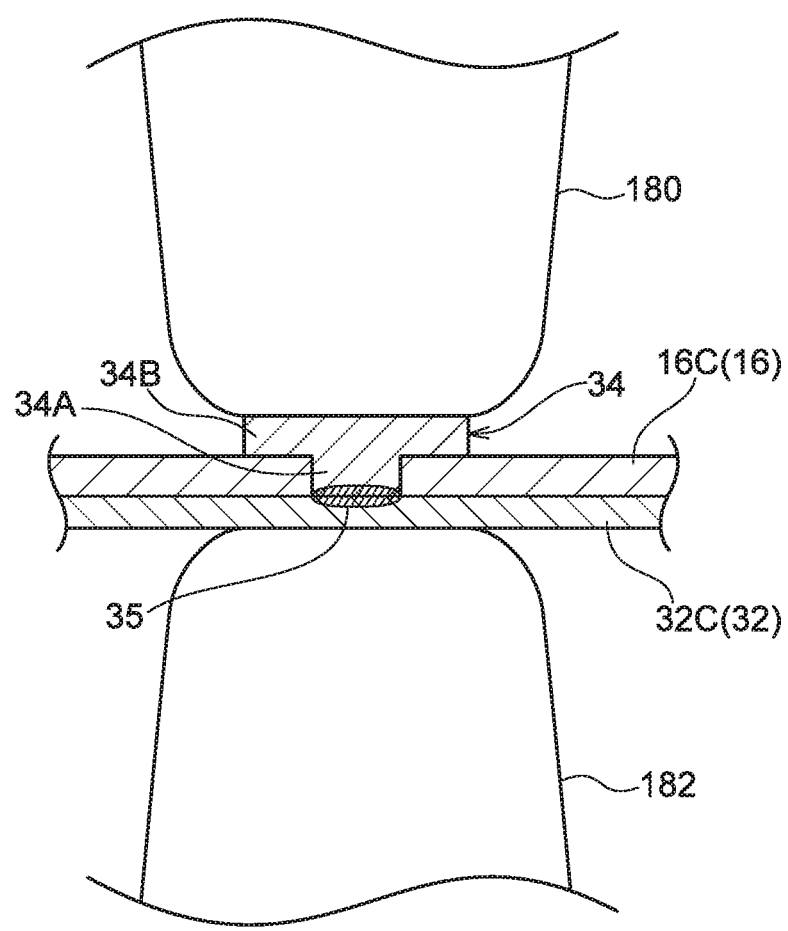
FIG. 6 is a cross-section illustrating a shaft of a rivet and a front header being joined together by welding in a vehicle member join structure according to the first exemplary embodiment.

Explanation follows regarding a method for joining using the rivet 34. For example, the shaft 34A of the rivet 34 is punched through the flange 16C of the roof panel 16 using a press. Note that a through-hole may be formed in the flange 16C of the roof panel 16 in advance. The flange 32C of the front header 32 is then made to contact a leading end of the shaft 34A of the rivet 34 and the flange 16C of the roof panel 16. Then, as illustrated in FIG. 6, one spot welding electrode tip 180 is held against the head 34B of the rivet 34, and another spot welding electrode tip 182 is held against the flange 32C. Current is passed between the spot welding electrode tip 180 and the spot welding electrode tip 182 in this state, such that a weld nugget 35 is formed straddling the leading end of the shaft 34A of the rivet 34 and part of the flange 32C, thereby joining the shaft 34A of the rivet 34 and the flange 32C together.

As illustrated in FIG. 2, the first join structure S30 includes a waterproof material 36 that prevents water ingress by covering a region where the head 34B of the rivet 34 and the flange 16C of the roof panel 16 contact each other. The waterproof material 36 is attached at a position covering at least part of the region where the rivet 34 and the flange 16C of the roof panel 16 contact each other. Note that the waterproof material 36 is an example of a waterproof section.

In the first join structure S30, the windshield glass 20 is disposed extending from a position encompassing the vehicle vertical direction upper side of the rivet 34 toward the vehicle front-rear direction outer side (the vehicle front-rear direction front side in the first exemplary embodiment). The waterproof material 36 is disposed further toward the vehicle front-rear direction inner side (namely, the vehicle front-rear direction rear side) than a vehicle front-rear direction outer end (a vehicle front-rear direction front end in the first exemplary embodiment) of the rivet 34, and is disposed so as to contact both the windshield glass 20 and the flange 16C of the roof panel 16. Note that the windshield glass 20 is an example of window glass. In the first exemplary embodiment, the waterproof material 36 is disposed between a lower face of the windshield glass 20 and the upper face of the flange 16C of the roof panel 16, and between the lower face of the windshield glass 20 and the head 34B of the rivet 34.

An upper face 36A of the waterproof material 36 is adhered to the lower face of the windshield glass 20 using an adhesive (not illustrated in the drawings). Toward the vehicle front-rear direction rear side, a lower face 36B of the waterproof material 36 is adhered to the upper face of the flange 16C of the roof panel 16 using an adhesive (not illustrated in the drawings). The vehicle front-rear direction front side of the lower face 36B of the waterproof material 36 is formed with a notch 36C cut into a corner so as to follow the head 34B of the rivet 34. The notch 36C contacts the head 34B of the rivet 34. In other words, the rivet 34 is disposed further toward a cabin interior of the vehicle 10 than an adhesion portion between the lower face 36B of the waterproof material 36 of the windshield glass 20 and the flange 16C of the roof panel 16. In the first exemplary embodiment, a sealing material formed of a foamed resin, such as polyurethane, is employed as the waterproof material 36.

For example, the windshield glass 20 is assembled to the flange 16C of the roof panel 16 in a state in which the upper face 36A of the waterproof material 36 has been adhered to the lower face of the windshield glass 20, such that the lower face 36B of the waterproof material 36 is adhered to the flange 16C of the roof panel 16.

A molding 38 is attached between a rear portion of the windshield glass 20, the vertical wall 16B of the roof panel 16, and the flange 16C of the roof panel 16. A main body 38A of the molding 38 is disposed between the windshield glass 20 and the flange 16C of the roof panel 16. Two lips 38B, 38C of the molding 38 are made to contact an end face of the windshield glass 20 and the vertical wall 16B of the roof panel 16 respectively.

Figure 3:
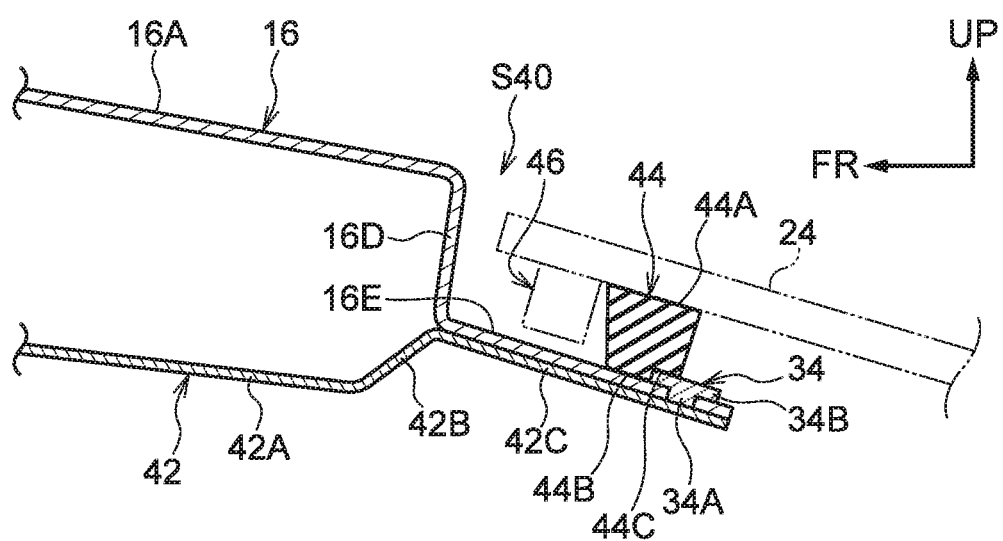
FIG. 3 is a cross-section (sectioned along line 3A-3A in FIG. 1) illustrating a join between a roof panel and a back window frame employed in a vehicle member join structure according to the first exemplary embodiment.

FIG. 3 is a cross-section (sectioned along line 3A-3A in FIG. 1) illustrating a second join structure S40, serving as a vehicle member join structure. As illustrated in FIG. 3, the roof panel 16 includes the main section 16A, a vertical wall 16D extending from a vehicle front-rear direction rear end of the main section 16A substantially toward the vehicle lower side, and a flange 16E extending from a lower end of the vertical wall 16D substantially toward the vehicle rear side. As previously described, the roof panel 16 is formed of an aluminum alloy, and is an example of a sheet-shaped first member.

The back window frame 42 includes a horizontal wall 42A disposed substantially along the vehicle width direction and substantially along the vehicle front-rear direction, a sloping portion 42B extending obliquely from a vehicle front-rear direction rear end of the horizontal wall 42A substantially toward the vehicle upper side and vehicle rear side, and a flange 42C extending from an upper end of the sloping portion 42B substantially toward the vehicle rear side. The flange 16E of the roof panel 16 is superimposed on an upper face of the flange 42C of the back window frame 42. The back window frame 42 is made of a ferrous metal. In the first exemplary embodiment, the back window frame 42 is formed of a high tensile strength steel material or a hot stamped material. Note that the back window frame 42 is an example of a sheet-shaped second member.

The second join structure S40 includes a rivet 34 that is made of a ferrous metal and that connects the flange 16E of the roof panel 16 and the flange 42C of the back window frame 42 together. A shaft 34A of the rivet 34 penetrates the flange 16E of the roof panel 16, and a head 34B of the rivet 34 remains at an outer surface (an upper face side in the first exemplary embodiment) of the flange 16E. The flange 16E of the roof panel 16 and the flange 42C of the back window frame 42 are connected to each other by welding the shaft 34A of the ferrous rivet 34 and the flange 42C of the ferrous back window frame 42 together. In the first exemplary embodiment, the shaft 34A of the rivet 34 and the flange 42C of the back window frame 42 are joined together by spot welding (see FIG. 6).

The second join structure S40 includes a waterproof material 44 that prevents water ingress by covering a region where the head 34B of the rivet 34 and the flange 16E of the roof panel 16 contact each other. The waterproof material 44 is attached at a position covering at least part of the region where the rivet 34 and the flange 16E of the roof panel 16 contact each other. Note that the waterproof material 44 is an example of a waterproof section.

In the second join structure S40, the back window glass 24, serving as window glass, is disposed extending from a position encompassing the vehicle vertical direction upper side of the rivet 34 toward the vehicle front-rear direction outer side (the vehicle front-rear direction rear side in the first exemplary embodiment). The waterproof material 44 is disposed further toward the vehicle front-rear direction inner side (the vehicle front-rear direction front side in the first exemplary embodiment) than a vehicle front-rear direction outer end (a vehicle front-rear direction rear end in the first exemplary embodiment) of the rivet 34, and is disposed so as to contact the back window glass 24 and the flange 16E of the roof panel 16. In the first exemplary embodiment, the waterproof material 44 is disposed between a lower face of the back window glass 24 and the upper face of the flange 16E of the roof panel 16, and between the lower face of the back window glass 24 and the head 34B of the rivet 34.

An upper face 44A of the waterproof material 44 is adhered to the lower face of the back window glass 24 using an adhesive (not illustrated in the drawings). Toward the vehicle front-rear direction front side, a lower face 44B of the waterproof material 44 is adhered to the upper face of the flange 16E of the roof panel 16 using an adhesive (not illustrated in the drawings). The vehicle front-rear direction rear side of the lower face 44B of the waterproof material 44 is formed with a notch 44C cut into a corner so as to follow the head 34B of the rivet 34. The notch 44C contacts the head 34B of the rivet 34. In other words, the rivet 34 is disposed further toward the cabin interior of the vehicle 10 than an adhesion portion between the lower face 44B of the waterproof material 44 of the back window glass 24 and the flange 16E of the roof panel 16. In the first exemplary embodiment, a sealing material formed of a foamed resin, such as polyurethane, is employed as the waterproof material 44.

A rubber dam 46 is provided to the lower face of the back window glass 24, further toward an end face of the back window glass 24 than the waterproof material 44. An upper face of the dam 46 is attached by adhesion or the like to the lower face of the back window glass 24. The dam 46 prevents the waterproof material 44 from being pushed out between the end face of the back window glass 24 and the vertical wall 16D of the roof panel 16.

Figure 4:
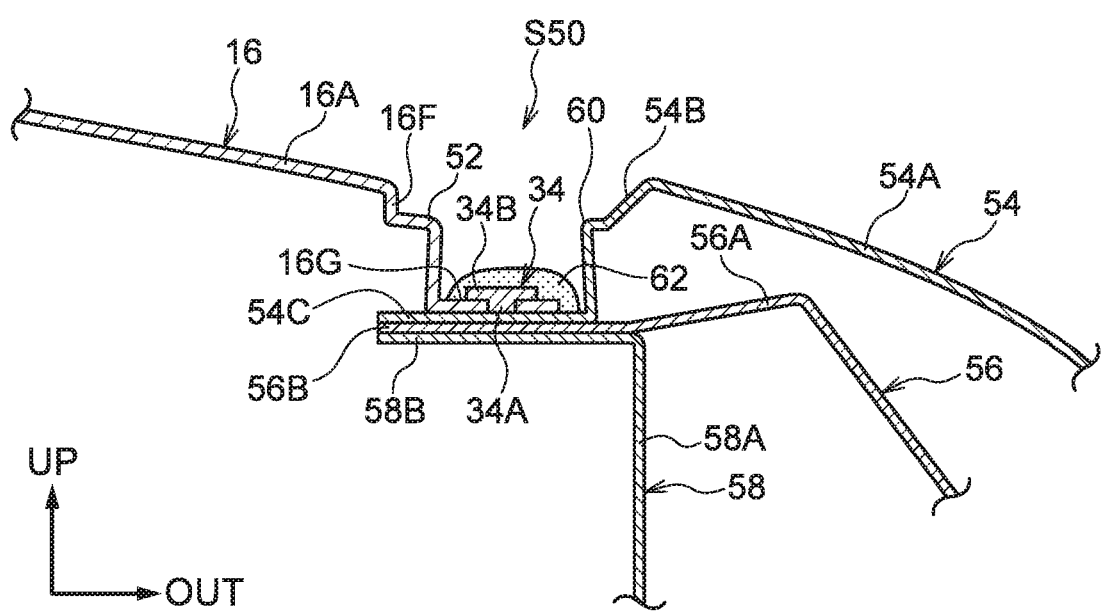
FIG. 4 is a cross-section (sectioned along line 4A-4A in FIG. 1) illustrating a join between a roof panel and a side outer employed in a vehicle member join structure according to the first exemplary embodiment.

FIG. 4 is a cross-section (sectioned along line 4A-4A in FIG. 1) illustrating a third join structure S50, serving as a vehicle member join structure. As illustrated in FIG. 4, the roof panel 16 includes the main section 16A, a vertical wall 16F disposed extending from a vehicle width direction outer end of the main section 16A substantially toward the vehicle lower side, and a shelf-shaped section 52 projecting in the form of a shelf toward the vehicle width direction outer side partway along the vertical wall 16F. The roof panel 16 also includes a flange 16G extending from a lower end of the shelf-shaped section 52 substantially toward the vehicle width direction outer side. The shelf-shaped section 52 is formed substantially in an inverted L-shape as viewed in cross-section, as illustrated in FIG. 4. As previously described, the roof panel 16 is formed of an aluminum alloy, and is an example of a sheet-shaped first member.

The third join structure S50 includes a side outer 54, serving as a side outer panel, disposed at the vehicle outer side (the vehicle vertical direction upper side in the first exemplary embodiment) at the vehicle width direction outer side of the roof panel 16. The third join structure S50 also includes a roof side rail outer 56 disposed at the vehicle inner side (the vehicle vertical direction lower side in the first exemplary embodiment) of the side outer 54, and a roof side rail inner 58 disposed at the vehicle inner side (the vehicle vertical direction lower side in the first exemplary embodiment) of the roof side rail outer 56. In the third join structure S50, the roof side rail 14 (see FIG. 1) is configured by the side outer 54, the roof side rail outer 56, and the roof side rail inner 58.

The side outer 54 includes a curved portion 54A disposed curving from a vehicle upper portion of the side outer 54 toward the vehicle width direction outer side and vehicle lower side, and a sloping portion 54B extending obliquely from a vehicle width direction inner end of the curved portion 54A toward the vehicle width direction inner side and vehicle lower side. The side outer 54 also includes a shelf-shaped section 60 projecting in the form of a shelf from a lower end of the sloping portion 54B substantially toward the vehicle width direction inner side, and a flange 54C extending from a lower end of the shelf-shaped section 60 substantially toward the vehicle width direction inner side. The shelf-shaped section 60 is formed substantially in an inverted L-shape as viewed in in cross-section, as illustrated in FIG. 4. The flange 16G of the roof panel 16 is superimposed on an upper face of the flange 54C of the side outer 54.

The side outer 54 is made of a ferrous metal. In the first exemplary embodiment, the side outer 54 is formed of a high tensile strength steel material or a hot stamped material. Note that the side outer 54 is an example of a sheet-shaped second member.

The roof side rail outer 56 includes a projection 56A projecting in a protruding shape, and a flange 56B extending from a vehicle width direction inner end of the projection 56A substantially toward the vehicle width direction inner side. The flange 54C of the side outer 54 is superimposed on an upper face of the flange 56B of the roof side rail outer 56. The roof side rail outer 56 is made of a ferrous metal.

The roof side rail inner 58 includes a wall 58A disposed substantially along the vehicle vertical direction, and a flange 58B extending from an upper end of the wall 58A substantially toward the vehicle width direction inner side. The flange 56B of the roof side rail outer 56 is superimposed on an upper face of the flange 58B of the roof side rail inner 58. The roof side rail inner 58 is made of a ferrous metal.

The third join structure S50 includes a rivet 34 that is made of a ferrous metal and that connects the flange 16G of the roof panel 16 and the flange 54C of the side outer 54 together. A shaft 34A of the rivet 34 penetrates the flange 16G of the roof panel 16, and a head 34B of the rivet 34 remains at an outer surface (an upper face side in the first exemplary embodiment) of the flange 16G. The flange 16G of the roof panel 16 and the flange 54C of the side outer 54 are connected to each other by welding the shaft 34A of the ferrous rivet 34 and the flange 54C of the ferrous side outer 54 together. In the first exemplary embodiment, the shaft 34A of the rivet 34 and the flange 54C of the side outer 54 are joined together by spot welding (see FIG. 6). The shaft 34A of the rivet 34 joins the flange 54C of the side outer 54, the flange 56B of the roof side rail outer 56, and the flange 58B of the roof side rail inner 58 together by spot welding in a state in which these three flanges have been superimposed on each other.

The third join structure S50 includes a sealant 62 that prevents water ingress by covering a region where the head 34B of the rivet 34 and the flange 16G of the roof panel 16 contact each other. The sealant 62 is disposed covering a region at the vehicle outer side of where the rivet 34 and the flange 16G of the roof panel 16 contact each other. Note that the sealant 62 is an example of a waterproof section. In the first exemplary embodiment, the sealant 62 entirely covers the head 34B of the rivet 34 contacting the flange 16G of the roof panel 16, and is disposed substantially along the vehicle front-rear direction such that the sealant 62 covers a region where an end face of the flange 16G of the roof panel 16 and the flange 54C of the side outer 54 contact each other.

The shelf-shaped section 52 of the roof panel 16 is formed with its length direction substantially along the vehicle front-rear direction at a side of the head 34B of the rivet 34. The shelf-shaped section 60 of the side outer 54 projects in the opposite direction to the projection direction of the shelf-shaped section 52 of the roof panel 16, and is formed with its length direction substantially along the vehicle front-rear direction at the side of the head 34B of the rivet 34.

Figure 5:
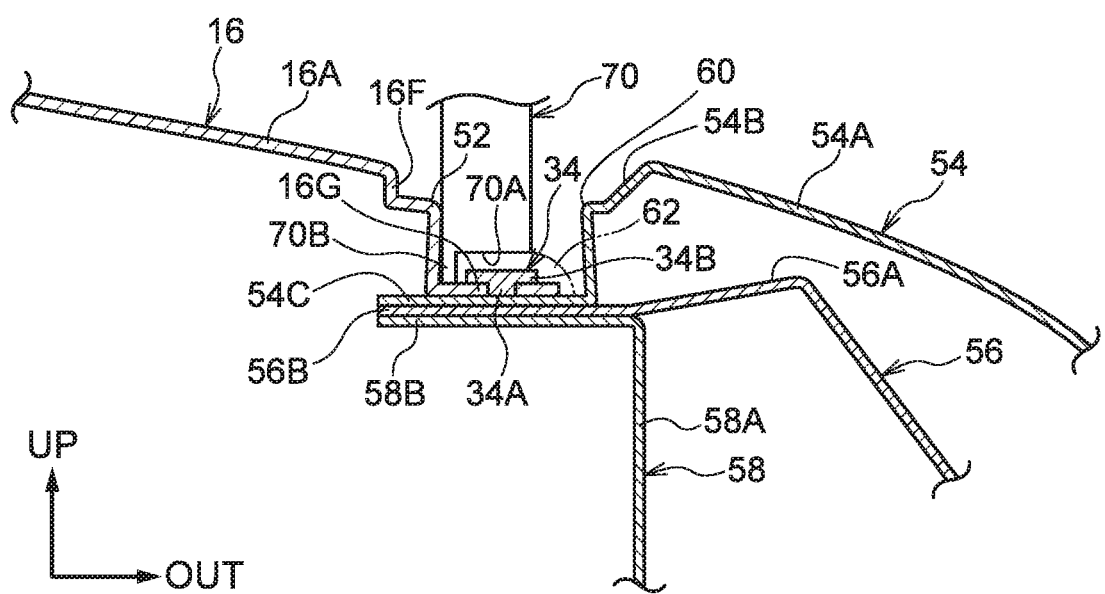
FIG. 5 is a cross-section illustrating sealant being applied to the join between the roof panel and the side outer illustrated in FIG. 4 using a sealant nozzle that has been made to contact a shelf-shaped section of the roof panel.

As illustrated in FIG. 5, a side portion of a sealant nozzle 70 through which the sealant 62 is discharged is made to contact either the shelf-shaped section 52 of the roof panel 16 or the shelf-shaped section 60 of the side outer 54 during application of the sealant 62. In FIG. 5, as an example, the side portion of the sealant nozzle 70 has made contact with the shelf-shaped section 52 of the roof panel 16. A nozzle 70A through which the sealant 62 (see FIG. 4) is discharged is provided to the sealant nozzle 70 at a position facing the head 34B of the rivet 34. A spacing rod 70B that maintains a specific spacing between the nozzle 70A and the flange 16G of the roof panel 16 projects out from the side portion of the sealant nozzle 70. In a state in which the side portion of the sealant nozzle 70 has been made to contact the shelf-shaped section 52 of the roof panel 16, and a tip of the spacing rod 70B has been made to contact the flange 16G of the roof panel 16, the sealant nozzle 70 is moved substantially along the vehicle front-rear direction while applying the sealant 62. The sealant nozzle 70 thereby applies the sealant 62 (see FIG. 4) at a specific position in a state in which the sealant nozzle 70 is guided by the shelf-shaped section 52 of the roof panel 16.

Explanation follows regarding operation and advantageous effects of the first exemplary embodiment.

As illustrated in FIG. 2, the first join structure S30 includes the flange 16C of the sheet-shaped roof panel 16 made of a lightweight metal and the flange 32C of the sheet-shaped ferrous front header 32. The ferrous rivet 34 is provided with the shaft 34A that penetrates the flange 16C of the roof panel 16 and the head 34B that remains at the outer surface of the flange 16C of the roof panel 16. The flange 16C of the roof panel 16 and the flange 32C of the front header 32 are connected together by welding the shaft 34A of the rivet 34 to the flange 32C of the front header 32. The first join structure S30 is also provided with the waterproof material 36 that prevents water ingress by covering the region where the head 34B of the rivet 34 and the flange 16C of the roof panel 16 contact each other. By providing the waterproof material 36, water does not readily enter the region where the head 34B of the rivet 34 and the flange 16C of the roof panel 16 contact each other. This enables electrolytic corrosion at the join configured by the rivet 34 between the roof panel 16 and the front header 32, namely, electrolytic corrosion caused by water present between the rivet 34 and the flange 16C of the roof panel 16, to be suppressed.

Moreover, as illustrated in FIG. 3, the second join structure S40 includes the flange 16E of the sheet-shaped roof panel 16 made of a lightweight metal and the flange 42C of the sheet-shaped back window frame 42 made of a ferrous metal. The ferrous rivet 34 is provided with the shaft 34A that penetrates the flange 16E of the roof panel 16 and the head 34B that remains at the outer surface of the flange 16E of the roof panel 16. The flange 16E of the roof panel 16 and the flange 42C of the back window frame 42 are connected together by welding the shaft 34A of the rivet 34 to the flange 42C of the back window frame 42. The second join structure S40 is also provided with the waterproof material 44 that prevents water ingress by covering the region where the head 34B of the rivet 34 and the flange 16E of the roof panel 16 contact each other. By providing the waterproof material 44, water does not readily enter the region where the head 34B of the rivet 34 and the flange 16E of the roof panel 16 contact each other. This enables electrolytic corrosion at the join configured by the rivet 34 between the roof panel 16 and the back window frame 42, namely, electrolytic corrosion caused by water present between the rivet 34 and the flange 16E of the roof panel 16, to be suppressed.

Moreover, as illustrated in FIG. 4, the third join structure S50 includes the flange 16G of the sheet-shaped roof panel 16 made of a lightweight metal and the flange 54C of the sheet-shaped side outer 54 made of a ferrous metal. The ferrous rivet 34 is provided with the shaft 34A that penetrates the flange 16G of the roof panel 16 and the head 34B that remains at the outer surface of the flange 16G of the roof panel 16. The flange 16G of the roof panel 16 and the flange 54C of the side outer 54 are connected together by welding the shaft 34A of the rivet 34 to the flange 54C of the side outer 54. The third join structure S50 is also provided with the sealant 62 that prevents water ingress by covering the region where the head 34B of the rivet 34 and the flange 16G of the roof panel 16 contact each other. By providing the sealant 62, water does not readily enter the region where the head 34B of the rivet 34 and the flange 16G of the roof panel 16 contact each other. This enables electrolytic corrosion caused by water present between the rivet 34 and the flange 16G of the roof panel 16 to be suppressed.

Moreover, in the third join structure S50, the region at the vehicle outer side of where the head 34B of the rivet 34 and the flange 16G of the roof panel 16 contact each other is covered by the sealant 62. This enables electrolytic corrosion at the join configured by the rivet 34 between the roof panel 16 and the side outer 54 to be suppressed. The region where the end face of the flange 16G of the roof panel 16 and the flange 54C of the side outer 54 contact each other is also covered by the sealant 62, enabling electrolytic corrosion between the end face of the flange 16G of the roof panel 16 and the flange 54C of the side outer 54 to also be suppressed.

In the first join structure S30, a high tensile strength steel material or hot stamped material is employed as the front header 32. This enables the strength of the front header 32 in the first join structure S30 to be better secured than in cases in which a general steel material is employed as a front header. In the second join structure S40 also, a high tensile strength steel material or hot stamped material is employed for the back window frame 42. This enables the strength of the back window frame 42 in the second join structure S40 to be better secured than in cases in which a general steel material is employed as a back window frame. In the third join structure S50, a high tensile strength steel material or hot stamped material is employed as the side outer 54. This enables the strength of the side outer 54 in the third join structure S50 to be better secured than in cases in which a general steel material is employed as a side outer.

In the third join structure S50, at the sides of the head 34B of the rivet 34, at least one from out of the roof panel 16 or the side outer 54 is formed with the shelf-shaped section 52, 60 with its length direction substantially along the vehicle front-rear direction. The side portion of the sealant nozzle 70 is thus guided by contacting the shelf-shaped section 52 or the shelf-shaped section 60. Ease of application of the sealant 62 is thereby improved.

In the first join structure S30, the waterproof material 36 is attached at a position covering at least part of the region where the rivet 34 and the flange 16C of the roof panel 16 contact each other. This facilitates waterproofing of the region where the rivet 34 and the flange 16C of the roof panel 16 contact each other. In the second join structure S40, the waterproof material 44 is attached at a position covering at least part of the region where the rivet 34 and the flange 16E of the roof panel 16 contact each other. This facilitates waterproofing of the region where the rivet 34 and the flange 16E of the roof panel 16 contact each other.

In the first join structure S30, the windshield glass 20 is disposed extending from a position encompassing the vehicle vertical direction upper side of the rivet 34 toward the vehicle front-rear direction outer side (the vehicle front-rear direction front side in the first exemplary embodiment). The waterproof material 36 is disposed further toward the vehicle front-rear direction inner side (namely, the vehicle front-rear direction rear side) than the vehicle front-rear direction outer end (the vehicle front-rear direction front end in the first exemplary embodiment) of the rivet 34, and is disposed so as to contact the windshield glass 20 and the flange 16C of the roof panel 16. Namely, in the first join structure S30, the waterproof material 36 is disposed further than the rivet 34 toward the side where water might ingress between the windshield glass 20 and the flange 16C of the roof panel 16. This enables both the amount of waterproof material 36 employed to be reduced and electrolytic corrosion to be suppressed.

In the second join structure S40, the back window glass 24 is disposed extending from a position encompassing the vehicle vertical direction upper side of the rivet 34 toward a vehicle front-rear direction outer side (such as the vehicle front-rear direction rear side). The waterproof material 44 is disposed further toward a vehicle front-rear direction inner side (such as the vehicle front-rear direction front side) than a vehicle front-rear direction outer end (such as the vehicle front-rear direction rear end) of the rivet 34, and is disposed so as to contact the back window glass 24 and the flange 16E of the roof panel 16. Namely, in the second join structure S40, the waterproof material 44 is disposed further than the rivet 34 toward the side where water might ingress between the back window glass 24 and the flange 16E of the roof panel 16. This enables both the amount of waterproof material 44 employed to be reduced and electrolytic corrosion to be suppressed.

Figure 11:
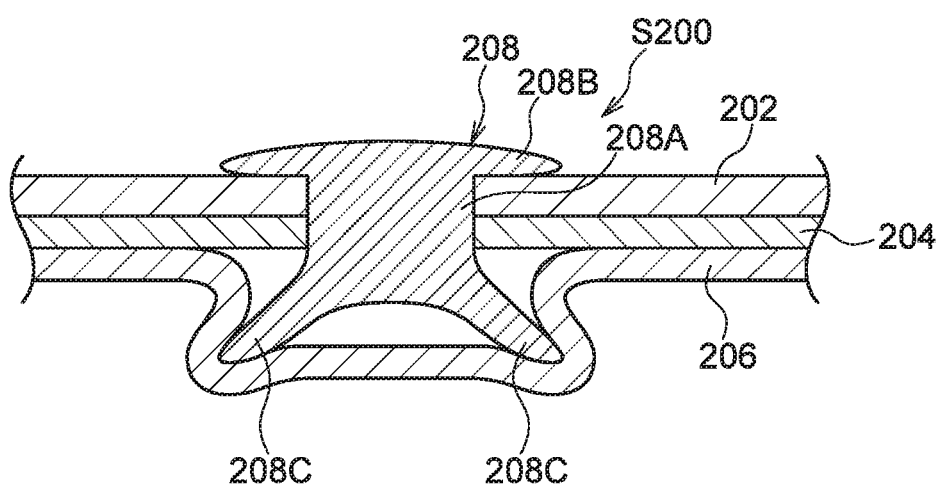
FIG. 11 is a cross-section illustrating a state in which a roof panel and a roof side rail employed in a vehicle member join structure according to a Comparative Example have been joined together using a non-penetrating rivet.

FIG. 11 is a cross-section illustrating a vehicle member join structure S200 of a Comparative Example.

As illustrated in FIG. 11, the vehicle member join structure S200 includes a roof panel 202 made of an aluminum alloy, a roof side rail outer 204 that contacts the roof panel 202 and is made of a steel sheet, and a roof side rail inner 206 that contacts the roof side rail outer 204 and is made of a steel sheet. A hot stamped material is employed as the roof side rail outer 204 and the roof side rail inner 206.

The vehicle member join structure S200 is provided with a self-piercing rivet (SPR) 208, serving as non-penetrating rivet, that joins the roof panel 202, the roof side rail outer 204, and the roof side rail inner 206 together. A shaft 208A of the self-piercing rivet 208 is made to penetrate the roof panel 202 and the roof side rail outer 204 by punching the self-piercing rivet 208 into the roof panel 202 and the roof side rail outer 204. At a tip of the shaft 208A, claws 208C of the self-piercing rivet 208 hook onto the roof side rail inner 206 at a portion of the roof side rail inner 206 that has undergone plastic deformation. A head 208B of the self-piercing rivet 208 remains at an outer surface of the roof panel 202, such that the roof panel 202, the roof side rail outer 204, and the roof side rail inner 206 are joined together by the head 208B and the claws 208C.

In the vehicle member join structure S200, since the self-piercing rivet 208 is punched into the roof side rail outer 204 formed of hot stamped material, openings or cracks sometimes develop in a punched edge face of the roof side rail outer 204. There is accordingly a possibility that the strength of the join might be reduced when the self-piercing rivet 208 is punched into the roof side rail outer 204 configuring a frame member.

Moreover, in cases in which the roof side rail inner 206 is a thin sheet, there is a possibility that the self-piercing rivet 208 might penetrate the roof side rail inner 206. A conceivable countermeasure would be to increase the sheet thickness of the roof side rail inner 206, for example; however, increasing the sheet thickness would lead to an increase in mass.

In contrast thereto, in the first join structure S30, the second join structure S40, and the third join structure S50, the shafts 34A of the rivets 34 penetrate the roof panel 16 made of an aluminum alloy, but do not penetrate the front header 32, the back window frame 42, or the side outer 54 that are made of ferrous metal. This enables a reduction in the strength of the joins using the rivets 34 to be suppressed, even in cases in which high tensile strength steel sheets or hot stamped material are employed as the front header 32, the back window frame 42, and the side outer 54. Moreover, the shafts 34A of the rivets 34 do not penetrate the front header 32, the back window frame 42, or the side outer 54 that are made of ferrous metal, thereby enabling the sheet thicknesses of the front header 32, the back window frame 42, and the side outer 54 to be set to the thinnest sheet thickness required in terms of vehicle performance (namely, the minimum sheet thickness required in terms of vehicle performance), enabling a reduction in weight.

Second Exemplary Embodiment

Figure 7:
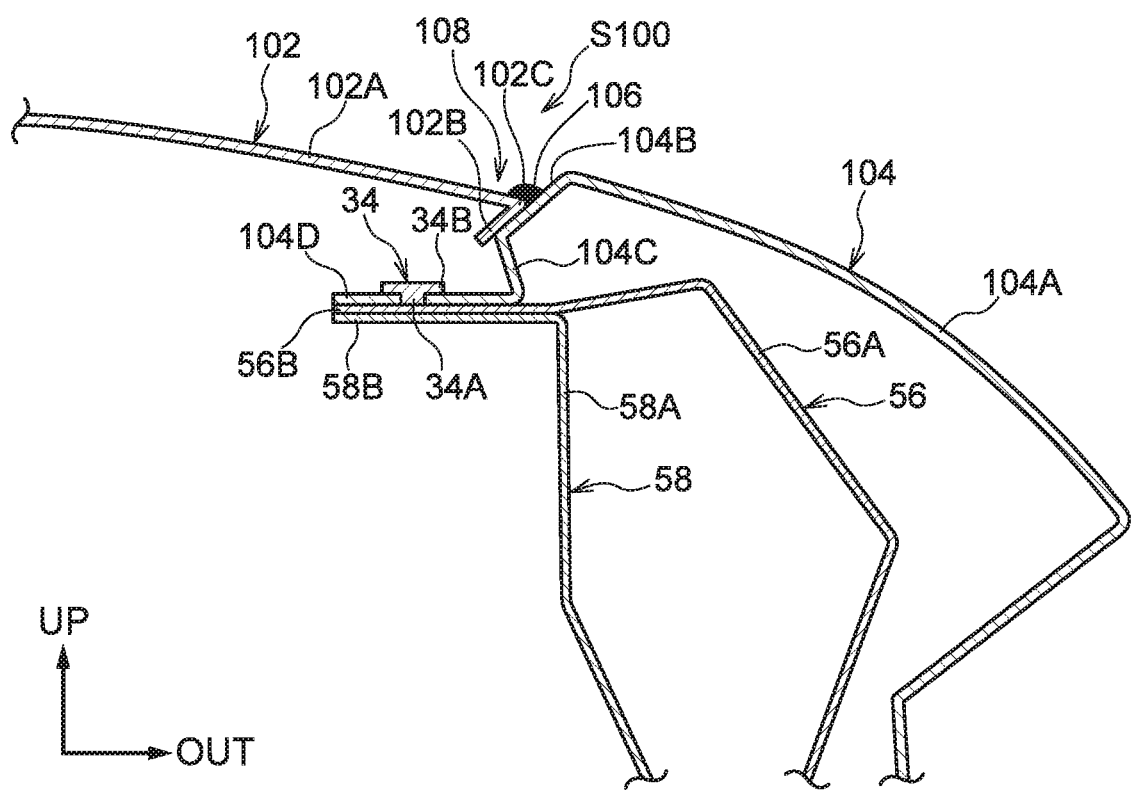
FIG. 7 is a cross-section illustrating a waterproof section and a join between a side outer and a roof side rail employed in a vehicle member join structure according to a second exemplary embodiment.

Explanation follows regarding a vehicle member join structure of a second exemplary embodiment, with reference to FIG. 7. Note that configuration portions similar to those in the first exemplary embodiment described above are applied with the same reference numerals, and explanation thereof is omitted.

FIG. 7 is a cross-section illustrating a fourth join structure S100 serving as a vehicle member join structure of the second exemplary embodiment. Note that the second exemplary embodiment is also provided with a first join structure S30 (see FIG. 2) and a second join structure S40 (see FIG. 3) similar to those in the first exemplary embodiment, and so explanation thereof is omitted. As illustrated in FIG. 7, the fourth join structure S100 includes a side outer 104 serving as a side outer panel made of a lightweight metal, a ferrous roof side rail outer 56, and a ferrous roof side rail inner 58. For example, the side outer 104 is formed of an aluminum alloy, and is an example of a sheet-shaped first member. The roof side rail outer 56 is formed of a high tensile strength steel material or a hot stamped material and is an example of a sheet-shaped second member. The fourth join structure S100 also includes a roof panel 102 made of a lightweight metal. In the second exemplary embodiment, the roof panel 102 is made of an aluminum alloy.

The side outer 104 is disposed at the vehicle width direction outer side of the roof panel 102. The roof side rail outer 56 is disposed at the vehicle inner side (the vehicle vertical direction lower side in the second exemplary embodiment) of the side outer 104. The roof side rail inner 58 is disposed at the vehicle inner side (the vehicle vertical direction lower side in the second exemplary embodiment) of the roof side rail outer 56.

The side outer 104 includes a projection 104A projecting obliquely toward the vehicle width direction outer side, and a sloping portion 104B extending obliquely from a vehicle width direction inner end of the projection 104A toward the vehicle width direction inner side and vehicle lower side. The side outer 104 also includes a wall 104C disposed extending obliquely from a lower end of the sloping portion 104B substantially toward the vehicle lower and outer side, and a flange 104D extending from a lower end of the wall 104C substantially toward the vehicle width direction inner side.

In the fourth join structure S100, a shaft 34A of a rivet 34 penetrates the flange 104D of the side outer 104, and a head 34B of the rivet 34 remains at an outer surface (an upper face side in the second exemplary embodiment) of the flange 104D. The flange 104D of the side outer 104 and a flange 56B of the roof side rail outer 56 are connected to each other by welding the shaft 34A of the ferrous rivet 34 and the flange 56B of the ferrous roof side rail outer 56 together by spot welding or the like. In the second exemplary embodiment, welding is performed with the flange 56B of the roof side rail outer 56 and a flange 58B of the roof side rail inner 58 superimposed on each other to form two layers.

The roof panel 102 includes a main section 102A that extends substantially along the vehicle front-rear direction and substantially along the vehicle width direction. The roof panel 102 also includes a bend 102B that bends from a vehicle width direction outer end of the main section 102A obliquely toward the vehicle width direction inner and lower side at a corner 102C (that is bent at the corner 102C), and that contacts the sloping portion 104B of the side outer 104. Note that the corner 102C is an example of a contact portion. The corner 102C of the roof panel 102 and the sloping portion 104B of the side outer 104 are joined together along substantially the vehicle front-rear direction at a join 106 by laser brazing. The join 106 configures a waterproof section 108 that prevents water ingress by covering a region where the rivet 34 and the flange 104D of the side outer 104 contact each other.

In the fourth join structure S100, the waterproof section 108 is configured by joining the corner 102C of the roof panel 102 and the sloping portion 104B of the side outer 104 together at the join 106. Thus water ingress into the region where the rivet 34 and the flange 104D of the side outer 104 contact each other is suppressed by the waterproof section 108, and electrolytic corrosion at the join configured by the rivet 34 is suppressed.

Third Exemplary Embodiment

Figure 8:
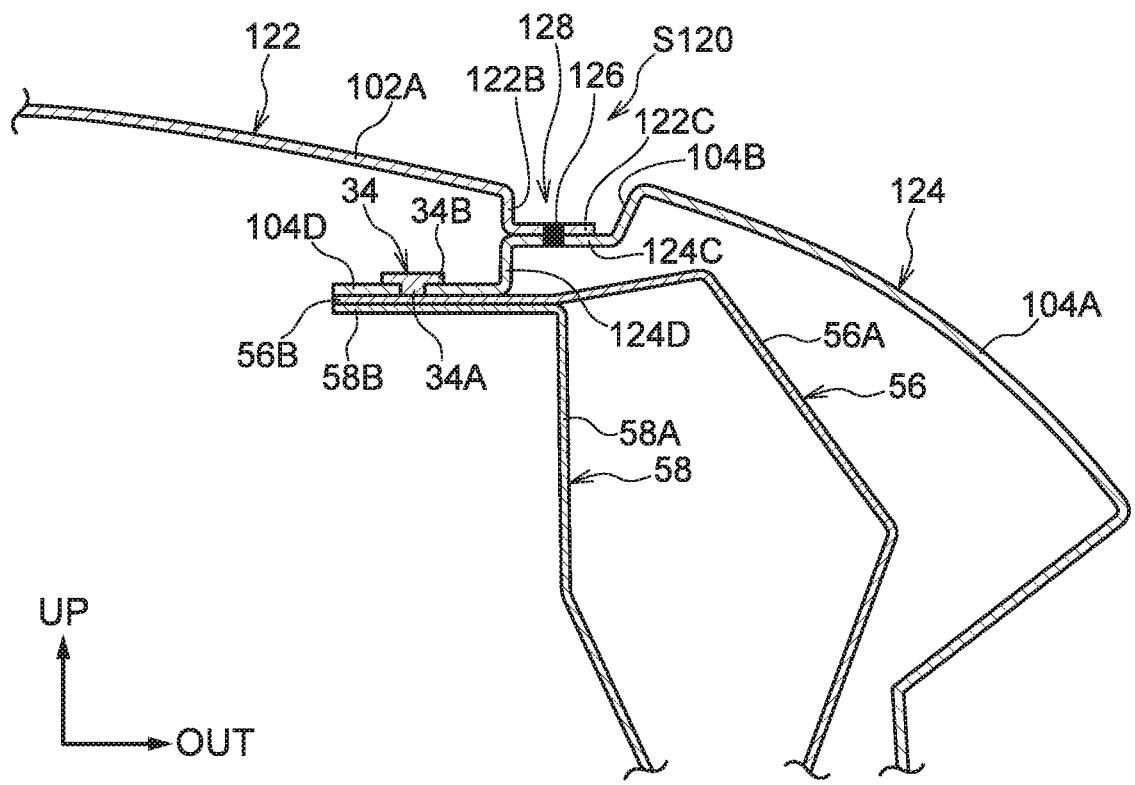
FIG. 8 is a cross-section illustrating a waterproof section and a join between a side outer and a roof side rail employed in a vehicle member join structure according to a third exemplary embodiment.

Explanation follows regarding a vehicle member join structure of a third exemplary embodiment, with reference to FIG. 8. Note that configuration portions similar to those in the first and second exemplary embodiments described above are applied with the same reference numerals, and explanation thereof is omitted.

FIG. 8 is a cross-section illustrating a fifth join structure S120 serving as a vehicle member join structure of the third exemplary embodiment. Note that the third exemplary embodiment is also provided with a first join structure S30 (see FIG. 2) and a second join structure S40 (see FIG. 3) similar to those in the first exemplary embodiment, and so explanation thereof is omitted. As illustrated in FIG. 8, the fifth join structure S120 includes a side outer 124 made of a lightweight metal, a ferrous roof side rail outer 56, and a ferrous roof side rail inner 58. For example, the side outer 124 is formed of an aluminum alloy, and is an example of a sheet-shaped first member. The roof side rail outer 56 is formed of a high tensile strength steel material or a hot stamped material and is an example of a sheet-shaped second member. The fifth join structure S120 also includes a roof panel 122 made of a lightweight metal. In the third exemplary embodiment, the roof panel 122 is made of an aluminum alloy.

The side outer 124 includes a projection 104A, a sloping portion 104B, and a horizontal wall 124C extending from a lower end of the sloping portion 104B substantially toward the vehicle width direction inner side. The side outer 124 also includes a vertical wall 124D extending from a vehicle width direction inner end of the horizontal wall 124C substantially toward the vehicle lower side, and a flange 104D extending from a lower end of the vertical wall 124D substantially toward the vehicle width direction inner side.

The roof panel 122 includes a vertical wall 122B extending from a vehicle width direction outer end of the main section 102A substantially toward the vehicle lower side, and a horizontal wall 122C serving as a contact portion that extends from a lower end of the vertical wall 122B substantially toward the vehicle width direction outer side and that is superimposed on the horizontal wall 124C of the side outer 124. The horizontal wall 122C of the roof panel 122 and the horizontal wall 124C of the side outer 124 are joined together along substantially the vehicle front-rear direction at a join 126 by laser welding. The join 126 configures a waterproof section 128 that prevents water ingress by covering a region where the rivet 34 and the flange 104D of the side outer 124 contact each other.

In the fifth join structure S120, the waterproof section 128 is configured by joining the horizontal wall 122C of the roof panel 122 and the horizontal wall 124C of the side outer 124 together at the join 126. Thus water ingress into the region where the rivet 34 and the flange 104D of the side outer 124 contact each other is suppressed by the waterproof section 128, and electrolytic corrosion at the join configured by the rivet 34 is suppressed.

Fourth Exemplary Embodiment

Figure 9:
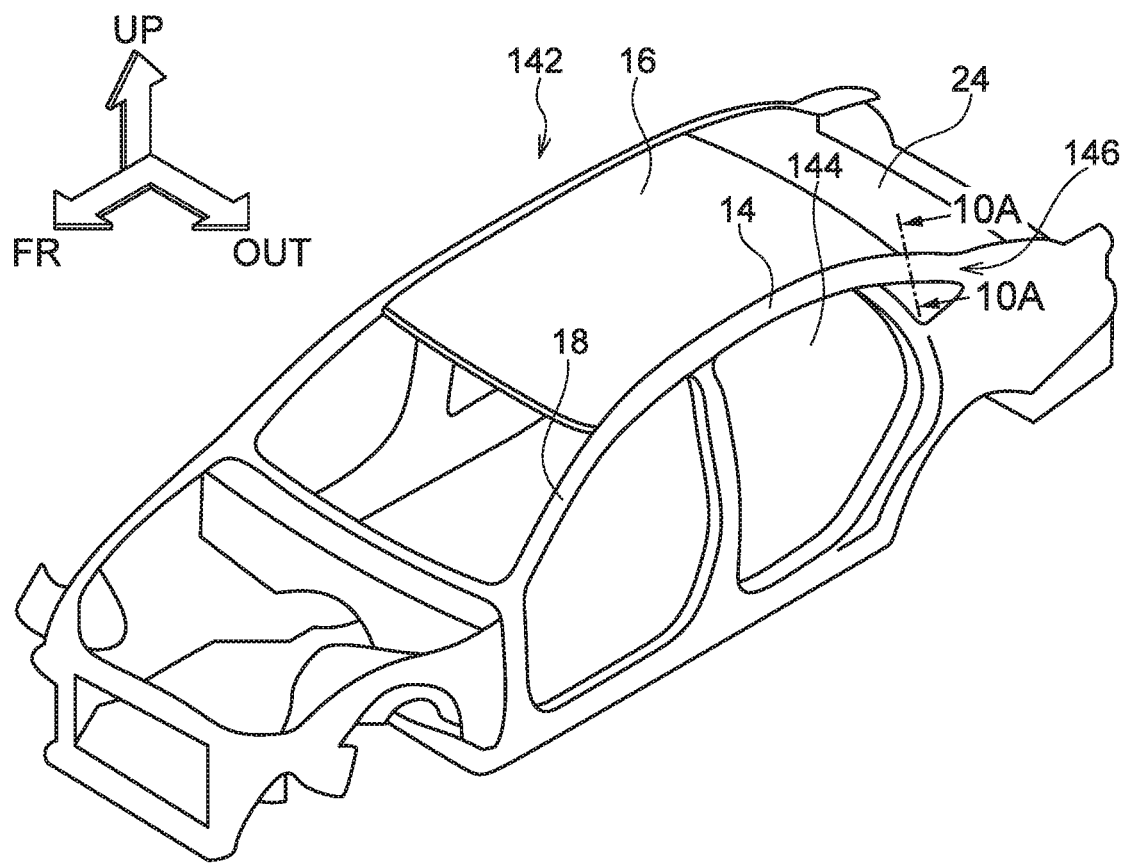
FIG. 9 is a schematic perspective view illustrating a vehicle applied with a vehicle member join structure according to a fourth exemplary embodiment.
Figure 10:
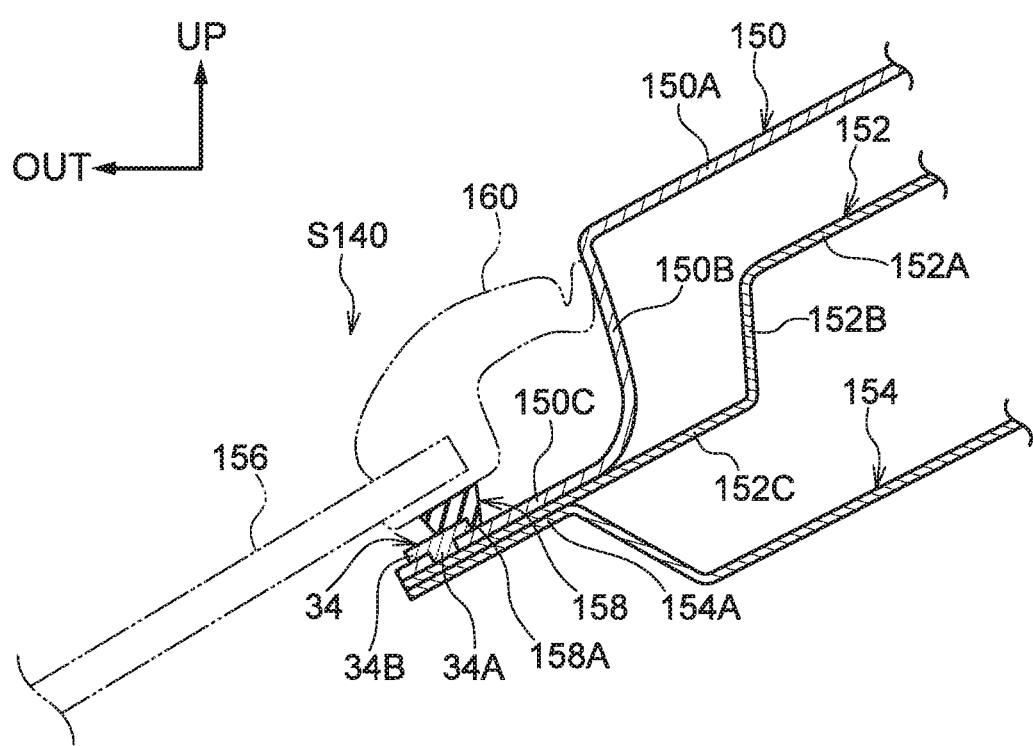
FIG. 10 is a cross-section (sectioned along line 10A-10A in FIG. 9) illustrating a join between a side member outer and a roof side rail employed in a vehicle member join structure according to the fourth exemplary embodiment.

Explanation follows regarding a vehicle member join structure of a fourth exemplary embodiment, with reference to FIG. 9 and FIG. 10. Note that configuration portions similar to those in the first to third exemplary embodiments described above are applied with the same reference numerals, and explanation thereof is omitted.

FIG. 9 is a perspective view illustrating a vehicle applied with a sixth join structure S140 (see FIG. 10) serving as a vehicle member join structure of the fourth exemplary embodiment. FIG. 10 is a cross-section (sectioned along line 10A-10A in FIG. 9) illustrating the sixth join structure S140.

As illustrated in FIG. 9, a quarter window 146, serving as a triangular window, is provided at the rear side of a rear door opening 144 at a front-rear direction rear section of a vehicle 142. The quarter window 146 is provided at a vehicle front-rear direction rear section of the roof side rail 14. The quarter window 146 is a fixed window that cannot be opened.

As illustrated in FIG. 10, the sixth join structure S140 includes a side member outer 150, serving as a side outer panel, disposed at the vehicle outer side (the vehicle vertical direction upper side in the fourth exemplary embodiment).

The sixth join structure S140 also includes a roof side outer 152 disposed at the vehicle inner side (the vehicle vertical direction lower side in the fourth exemplary embodiment) of the side member outer 150, and a roof side inner 154 disposed at the vehicle inner side (the vehicle vertical direction lower side in the fourth exemplary embodiment) of the roof side outer 152.

The side member outer 150 includes a sloping portion 150A disposed extending obliquely toward the vehicle width direction outer side and vehicle lower side, and a vertical wall 150B extending from a vehicle width direction outer end of the sloping portion 150A substantially toward the vehicle lower side. The side member outer 150 also includes a flange 150C extending obliquely from a lower portion of the vertical wall 150B substantially toward the vehicle width direction outer side and vehicle lower side. The side member outer 150 is made of a lightweight metal. For example, the side outer 150 is formed of an aluminum alloy, and is an example of a sheet-shaped first member.

The roof side outer 152 includes a sloping portion 152A disposed extending obliquely toward the vehicle width direction outer side and vehicle lower side, and a vertical wall 152B extending from a vehicle width direction outer end of the sloping portion 152A substantially toward the vehicle lower side. The roof side outer 152 also includes a flange 152C extending obliquely from a lower portion of the vertical wall 152B substantially toward the vehicle width direction outer side and vehicle lower side. The flange 150C of the side member outer 150 is superimposed on the flange 152C of the roof side outer 152. The roof side outer 152 is made of a ferrous metal. In the fourth exemplary embodiment, the roof side outer 152 is formed of a high tensile strength steel material or a hot stamped material. Note that the roof side outer 152 is an example of a sheet-shaped second member.

The roof side inner 154 bends in a crank shape toward the vehicle upper side on progression toward the vehicle width direction outer side. A flange 154A is formed extending obliquely substantially toward the vehicle width direction outer side and vehicle lower side at a vehicle width direction outer end of the roof side inner 154. The flange 152C of the roof side outer 152 is superimposed on the flange 154A of the roof side inner 154. The roof side inner 154 is made of a ferrous metal.

In the sixth join structure S140, a shaft 34A of a rivet 34 penetrates the flange 150C of the side member outer 150, and a head 34B of the rivet 34 remains at an outer surface (an upper face side in the fourth exemplary embodiment) of the flange 150C. The flange 150C and the flange 152C are connected to each other by welding the shaft 34A of the ferrous rivet 34 and the flange 152C of the ferrous roof side outer 152 together by spot welding or the like. In the fourth exemplary embodiment, welding is performed with the flange 152C of the roof side outer 152 and the flange 154A of the roof side inner 154 superimposed on each other to form two layers.

The sixth join structure S140 includes a waterproof material 158 that prevents water ingress by covering a region where the head 34B of the rivet 34 and the flange 150C of the side member outer 150 contact each other. The waterproof material 158 is attached at a position covering at least part of the region where the rivet 34 and the flange 150C of the side member outer 150 contact each other. Note that the waterproof material 158 is an example of a waterproof section.

In the sixth join structure S140, quarter window glass 156, serving as window glass, is disposed extending from a position encompassing the vehicle vertical direction upper side of the rivet 34 toward the vehicle width direction outer side. The waterproof material 158 is disposed further toward the vehicle width direction inner side than a vehicle width direction outer end of the rivet 34, and is disposed so as to make contact with a molding 160 attached to the quarter window glass 156 and with the flange 150C of the side member outer 150. In the fourth exemplary embodiment, a lower face 158A of the waterproof material 158 is adhered to an upper face of the flange 150C using an adhesive (not illustrated in the drawings). The vehicle width direction outer side of the lower face 158A of the waterproof material 158 is formed with a notch cut into a corner so as to follow the head 34B of the rivet 34, and the notch contacts the head 34B of the rivet 34. The rivet 34 is disposed further toward the cabin interior of the vehicle 142 than an adhesion portion between the lower face 158A of the waterproof material 158 and the flange 150C of the side member outer 150. The molding 160 is attached so as to surround a vehicle width direction inner end of the quarter window glass 156. A vehicle width direction inner end of the molding 160 is disposed so as to contact the vertical wall 150B of the side member outer 150.

By providing the waterproof material 158 in the sixth join structure S140, water does not readily enter the region where the head 34B of the rivet 34 and the flange 150C of the side member outer 150 contact each other. This enables electrolytic corrosion at the join configured by the rivet 34 between the side member outer 150 and the roof side outer 152, namely, electrolytic corrosion caused by water present between the rivet 34 and the flange 150C of the side member outer 150, to be suppressed.

Note that a vehicle member join structure of the present disclosure is not limited to the configuration of the first to fourth exemplary embodiments, and may be provided at other locations of a vehicle. For example, a vehicle member join structure of the present disclosure may be applied at the periphery of a hood.

Particular exemplary embodiments of the present disclosure have been explained in detail; however, the present disclosure is not limited to these exemplary embodiments, and it would be obvious to a skilled practitioner that various other exemplary embodiments may be implemented within the scope of the present disclosure.

The disclosure of Japanese Patent Application No. 2017-235584, filed on Dec. 7, 2017, is incorporated in its entirety by reference herein.

All cited documents, patent applications, and technical standards mentioned in the present specification are incorporated by reference in the present specification to the same extent as if each individual cited document, patent application, or technical standard was specifically and individually indicated to be incorporated by reference.

What is claimed is:

1. A vehicle member join structure comprising:
   a sheet-shaped first member made of a lightweight metal;
   a sheet-shaped second member made of a ferrous metal;
   a rivet made of a ferrous metal and comprising a shaft that penetrates the first member and a head that remains at an outer surface of the first member, the shaft being welded to the second member so as to connect the first member and the second member together; and
   a waterproof section that prevents water ingress by covering a region where the rivet and the first member contact each other.

2. The vehicle member join structure of claim 1, wherein a high tensile strength steel material or an ultra-high tensile strength steel material is employed as the second member.

3. The vehicle member join structure of claim 1, wherein:
the first member is a roof panel that extends, at an upper section of a vehicle, along a vehicle front-rear direction and a vehicle width direction;
the second member is a side outer panel that extends along the vehicle front-rear direction at a side section of the vehicle; and
the waterproof section is a sealant that covers a region where the rivet and the roof panel contact each other at a vehicle outer side.

4. The vehicle member join structure of claim 3, wherein a shelf-shaped section, that has a length direction along the vehicle front-rear direction and is disposed at a side of the head of the rivet, is formed to at least one from out of the roof panel or the side outer panel.

5. The vehicle member join structure of claim 1, wherein:
the first member is a roof panel that extends, at an upper section of a vehicle, along a vehicle front-rear direction and a vehicle width direction; and
the second member is a front header that extends along the vehicle width direction at a lower side of a vehicle front-rear direction front end of the roof panel.

6. The vehicle member join structure of claim 1, wherein:
the first member is a roof panel that extends, at an upper section of a vehicle, along a vehicle front-rear direction and a vehicle width direction; and
the second member is a back window frame that extends along the vehicle width direction at a lower side of a vehicle front-rear direction rear end of the roof panel.

7. The vehicle member join structure of claim 1, wherein:
the first member is a side outer panel that is disposed along an edge of a triangular window provided at a rear section of a vehicle and that extends along a vehicle front-rear direction; and
the second member is a roof side outer portion that extends along the vehicle front- rear direction at a vehicle inner side of the side outer panel.

8. The vehicle member join structure of claim 5, wherein the waterproof section is a waterproof material that is attached at a position covering at least part of a region where the rivet and the first member contact each other.

9. The vehicle member join structure of claim 6, wherein the waterproof section is a waterproof material that is attached at a position covering at least part of a region where the rivet and the first member contact each other.

10. The vehicle member join structure of claim 7, wherein the waterproof section is a waterproof material that is attached at a position covering at least part of a region where the rivet and the first member contact each other.

11. The vehicle member join structure of claim 8, wherein:
window glass is disposed extending from a position encompassing a vehicle vertical direction upper side of the rivet toward a vehicle front-rear direction outer side; and
the waterproof material is disposed further toward a vehicle front-rear direction inner side than a vehicle front-rear direction outer end of the rivet and is configured so as to seal between the window glass and the first member.

12. The vehicle member join structure of claim 9, wherein:
window glass is disposed extending from a position encompassing a vehicle vertical direction upper side of the rivet toward a vehicle front-rear direction outer side; and
the waterproof material is disposed further toward a vehicle front-rear direction inner side than a vehicle front-rear direction outer end of the rivet and is configured so as to seal between the window glass and the first member.

13. The vehicle member join structure of claim 10, wherein:
window glass is disposed extending from a position encompassing a vehicle vertical direction upper side of the rivet toward a vehicle width direction outer side; and
the waterproof material is disposed further toward a vehicle width direction inner side than a vehicle width direction outer end of the rivet and is configured so as to seal between the window glass and the first member.

14. The vehicle member join structure of claim 1, wherein:
the first member is a side outer panel that extends along a vehicle front-rear direction at a side section of a vehicle;
the second member is a roof side rail outer portion that extends along the vehicle front-rear direction at a vehicle vertical direction lower side of the side outer panel; and
the waterproof section is configured by joining a lightweight metal roof panel and the side outer panel together at a join running along the vehicle front-rear direction at a contact portion where the lightweight metal roof panel and the side outer panel are made to contact each other.

15. The vehicle member join structure of claim 2, wherein:
the first member is a side outer panel that is disposed along an edge of a triangular window provided at a rear section of a vehicle and that extends along a vehicle front-rear direction; and
the second member is a roof side outer portion that extends along the vehicle front- rear direction at a vehicle inner side of the side outer panel.

16. The vehicle member join structure of claim 15, wherein the waterproof section is a waterproof material that is attached at a position covering at least part of a region where the rivet and the first member contact each other.

* * * * *